3,338,720
FLUID MARGARINE EMULSION STABILIZED BY HARD FAT
Michael J. Pichel, Chicago, Ill., assignor to Swift & Company, Chicago, Ill., a corporation of Illinois
No Drawing. Filed Jan. 7, 1964, Ser. No. 336,136
10 Claims. (Cl. 99—123)

This invention relates to water-in-oil emulsion food products and, more particularly, to emulsion-type products which are characterized as being of the margarine type.

The composition and characteristics of margarine are determined for the most part by government standards and the standard of identity for margarine as promulgated by the Federal Security Administration defines margarine as a plastic food product containing not less than 80% fat emulsified with moisture in excess of 1%. In accordance with government regulations the aqueous phase of margarine can be made up of cream, milk, skim milk, or any combination of dried skim milk and water where the dried skim milk is not less than 10% by weight of the water. Other ingredients which are permitted under the standards of identity include artificial coloring, preservatives, sodium chloride, vitamins A and D, artificial flavor such as diacetyl, added as such or starter distillate or produced by the addition of citric acid or citrates. In addition, antispattering agents such as lecithin and emulsifiers such as mono- and diglycerides, either per se or in combination with sodium sulfoacetate derivatives thereof, and butter are permitted.

The fat compound in the margarine provides firmness or plasticity in the margarine and various fats and oils and blends thereof have been employed in the production of margarine products. Such fats and oils in varying proportions, in the unhydrogenated, partially hydrogenated, and completely hydrogenated form, have been blended to produce products having the desired plasticity and body. Accordingly, the fat component of margarine currently marketed is responsible for the plastic nature of the product.

While margarines of excellent consistency, flavor and nutritional value have been available for some time, and improvements in margarine products are continually being introduced, these margarines and the improvements suggested have, for the most part, been related to plastic margarine, closely simulating butter in appearance and consistency, and improvements in nutritional and flavor characteristics thereof.

Although such margarines, like butter, are quite satisfactory when used as spreads for bread and the like, they do possess some inherent limitations when it is desired to apply such products in the form of a liquid. As long as products such as butter and margarine are plastic solids, separation of the oil and aqueous phases is largely impeded by the physical state of the fat. However, when plastic margarines are heated to a temperature above the melting point of the fat and held at this elevated temperature for any substantial period of time, separation of the oil and aqueous phases takes place. Various emulsifiers and stabilizers have, with varying degrees of success, been employed to inhibit this separation of phases, but the tendency of such plastic products when melted to separate into two phases is substantial. One method for measuring the degree of resistance to separation of phases, when a plastic margarine is held at elevated temperatures, involves holding the margarine at about 140° F. in a measuring cylinder and noting the time to separation of phases. Under such conditions, some of the margarines now commercially marketed separate in a few minutes and even the most stable products separate in a matter of hours. Thus, when such products are used in restaurants or hotel kitchen where a container of melted margarine is maintained for use on vegetables and other foods, a substantial amount of curd is lost, and the result is that in dispensing the product it is found that the product being dispensed is largely margarine oil.

It is accordingly an object of this invention to provide a stable, water-in-oil emulsion food product which is liquid at temperatures as low as about 35° F., and which is resistant to emulsion breaking.

Another object of the invention is the provision of a liquid margarine emulsion which contains the margarine ingredients of fat, water, milk solids, etc., yet which is fluid at refrigerator temperatures.

Still another object of the invention is to provide a method for the manufacture of fluid, water-in-oil, margarine-type emulsions which are resistant to separation of phases over a wide temperature range.

Additional objects of the invention, if not specifically set forth herein, will be readily apparent to those skilled in the art from the detailed description of the invention which follows.

The invention in general involves the production of an edible, water-in-oil emulsion food product which simulates margarine in many respects yet possesses many advantageous characteristics not found in most plastic margarines. The improved margarines of the invention represent a significant departure from prior art margarines in that the products of the invention are not plastic at room temperatures but rather are in the form of a fluid emulsion. These emulsions are pourable over a wide temperature range and are fluid and pourable at refrigerator temperatures, yet the product is protected against breaking of the emulsion and separation of aqueous and oil phases even when exposed to sharp changes in temperature. The emulsions contain the usual margarine ingredients including glyceride oil, milk, or an aqueous phase containing milk solids, and an emulsion-stabilizing amount of a crystalline hard fat. The fluid margarine product is manufactured by a procedure similar to that used for the production of plastic margarine, with the exception that after the emulsion has been chilled, that is after the "Votator" A unit the emulsion should be allowed to crystallize. As the emulsion crystallizes it assumes a consistency similar to that of mayonnaise or jelly. The weak crystal lattice thus formed is then broken by stirring or pumping or shaking. When the gel structure is broken up the product is converted to a smooth, homogeneous, liquid form, and is in condition for use for packaging and shipping.

In the manufacture of the product, the liquid oil is heated to a temperature sufficient to dissolve all oil-soluble components and these materials are added to the oil. Usually the hard fat is the highest melting oil soluble ingredient and thus heating will be in the range of the melting point of the hard fat or around 120–180° F. Higher and lower temperatures can be used if desired. After the emulsion is formed it may be chilled in a votator or equivalent device. The temperature of the emulsion should be lowered sufficiently to promote crystallization. It has been found that cooling to about 55° F. and below is adequate. Cooling at lower temperatures of about 30–40° F. aids in speeding up the operation. Temperatures lower than 30° F. can also be used but there is no particular advantage in cooling much below this temperature.

More particularly, the fluid emulsions of the invention comprise smooth, homogeneous mixtures of a major amount of a glyceride oil which is liquid at temperatures of about 78° F. and below, a minor amount of an aqueous phase containing milk solids, and a small amount, usually less than about 7.5%, based on the weight of the emulsion, of a hard fat. The emulsion in its preferred form also contains vitamins, preservatives, coloring agents, flavoring agents, antispattering agents, and emulsifiers such as mono and diglycerides. The product is manufactured by forming an emulsion of the two liquid phases, chilling the emulsion to cause an increase in the viscosity thereof and promote the formation of a gel, followed by mechanical working as by shaking, stirring, or pumping. This mechanical working serves to break up the gel structure and produce a smooth, homogeneous, liquid product, having a surprisingly good resistance to viscosity changes over a wide temperature range.

The aqueous phase of the fluid margarine of the invention comprises about 10–40% by weight of the product. Although government standards of identity for margarine allow for about 20% or less water in the finished margarine and the preferred emulsions of this invention contain about 15–20% aqueous phase, it is possible to produce very desirable fluid emulsion products containing as much as 40% water. The aqueous phase comprises whole milk, skim milk, cream, reconstituted nonfat dry milk, soya milk, or any combination thereof. Salt in an amount of about 1–4% and preferably about 2–3% may also be included. The milk phase imparts flavor to the product and harmless bacterial-starter cultures may be incorporated to enhance flavor. Where reconstituted skim milk is used the dry skim milk should be present in aqueous solution in an amount of at least about 10% by weight. Usually the aqueous phase will contain about 10–13% total solids.

The fat phase of the liquid emulsions of the invention is composed of liquid glyceride oil such as the naturally occurring vegetable oils and some animal oils and blends thereof. Where required, the vegetable oils should be refined and deodorized to insure that the product is free of undesirable flavors and undesirable flavor precursors. The oil should be one that is substantially free of high melting ingredients and, for this reason, it is preferred that winterized oils or oils which are naturally liquid at low temperature (35° F. or less) be employed. The oil should be one which has a cold test in excess of about eight hours. Salad oils and some cooking oils which have been freed of high melting components may be used and, specifically, such naturally occurring glyceride oils and mixtures thereof as soybean oil, cottonseed oil, corn oil, safflower oil, rapeseed oil, sunflower oil, sesame oil, and others, as well as mixtures thereof, can form a part or all of the oil phase. Refined vegetable oils of good color having a cold test in excess of about eight hours and preferably about 15–24 hours or more are very satisfactory. The cold test of the American Oil Chemists Society involves placing the oil to be tested in a sealed 4-ounce bottle and placing the bottle in a bath of melting ice at 32° F. The number of hours required for the oil to cloud is noted and the cold test is expressed in terms of hours. It is possible where desired to utilize glyceride oils having a sufficiently high linoleic acid content and a sufficiently high linoleic acid to saturated fatty acid ratio to provide fluid margarines having outstanding nutritional characteristics.

Stability of the emulsion, when the emulsion is in the fluid form as distinguished from plastic margarine emulsions, has presented some difficulty. Fluid margarine emulsions lack the solid or plastic structure which contributes to emulsion stability of the plastic product and, accordingly, a particular group of emulsion stabilizing agents are included in the emulsions of the invention. Although it has been generally considered in the prior art that hard fats are to be avoided, if stable emulsions of fat and water are to be produced, it has been found in the present instance that a small amount of hard fat very effectively stabilizes the emulsions of the invention and serves to prevent emulsion breaking as well as solidification. In many fluid emulsion products, such as mayonnaise or salad dressing, crystalline fats are carefully avoided, since a small amount of crystalline fat appears to promote solidification of the oil in such products at refrigerator temperatures with resultant emulsion breakdown. The emulsions of this invention on the other hand are very effectively stabilized by the presence in the emulsion of a small amount of hard fat having a titer in the range of about 50–65° C. The amount of crystalline hard fat used in the emulsion is variable, depending upon the oil used in the emulsion, and the relative disposition of such oil to crystallize. Additionally, the amount of hard fat required to obtain emulsion stability is determined to some degree by the hardness of the fat. It is desirable, depending upon the specific hard fat used and characteristics of the oil present in the oil phase of the emulsion, to add about 0.75–7.5% hard fat based on the weight of the emulsion.

The hard fat comprises a hydrogenated animal fat or vegetable oil, such as hydrogenated rapeseed oil, hydrogenated tallow, hydrogenated lard, hydrogenated cottonseed, soybean, peanut, olive, cocoanut, corn safflower, sunflower, or sesame oil hydrogenated to a sufficient degree so that the titer of the hard fat falls in the range of about 50–65° C. Titer is the temperature at which crystallization begins when the fatty acids of a fat are cooled after melting. The test is carried out by saponifying the fat sample with alkali, separating the liberated fatty acid, washing and fusing the fatty acid, and then cooling. The temperature at which crystallization begins is the titer value. Utilizing the hard fats in the proper amounts in emulsions comprising about 60–90% glyceride oil phase and about 40–10% aqueous phase, and incorporating flavoring agents and coloring agents in the margarine emulsion, results in the production of very attractive, creamy, yellow, stable emulsions.

The incorporation of hard fat in the proper amount in the emulsion has resulted in a very unexpected and desirable dual effect of preventing oil and water separation and also avoiding viscosity increases and solidification of the emulsion. It has been found that the harder the hard fat is (higher titer) the less of the hard fat will be needed to stabilize the emulsion against separation. Additionally, avoidance of viscosity increase and solidification is greatest when the least amount of hard fat is used. For example, hard fats having a titer in the range of about 55–60° and above are most preferred inasmuch as only a very small amount of such hard fats are needed to inhibit emulsion separation and such small amounts do not cause the product to increase in viscosity or change to the plastic state. Those hard fats which have a lower titer (the "softer" hard fats) must be used in larger amounts to obtain protection against phase separation. Such large amounts in turn increase the tendency of the fat phase of the emulsion to crystallize and increase the danger of converting the emulsion from the liquid to the plastic state. Thus hard fats having a titer in the range of 50–52° C. must be employed in larger amounts to prevent oil and water separation, and the presence of such larger amounts of hard fat in the product favors crystallization and development of plasticity in the product. While these softer fats can be employed in accordance with the invention, greater assurance of maintenance of the fluid emulsion is obtained utilizing those hard fats having a titer in the range of about 55–60° C. and above. Completely hydrogenated rapeseed oil, completely hydrogenated palm oil, and completely hydrogenated peanut oil are examples of hard fats particularly suitable for use as the hard fat in the emulsion.

Specific hardened glyceride oils which are representative of the emulsion-stabilizing group and characteristic as well as effective amounts of each are set forth in Table I which follows:

TABLE I

| Hard Fat | Titer, °C. | I.V. | Amount and Percent Based on Emulsion Weight | |
|---|---|---|---|---|
| | | | Effective | Preferred |
| Completely hydrogenated rapeseed oil | 58.8 | 8.1 | 1.3-5.0 | 1.75-3.0 |
| Completely hydrogenated cottonseed oil | 59 | 20 | 0.75-7.5 | 2.75-5.0 |
| Lard | 59 | | 1.0-5.0 | 2.0-3.5 |
| Hydrogenated tallow | 59 | 10 | 1.0-5.0 | 2.0-3.5 |

Other oils, such as sunflower seed oil, corn oil, sesame oil, olive oil, and soybean oil, can be hydrogenated to an iodine value of 1–50 to provide the required titer. Usually the more completely hydrogenated oils will be preferred.

The examples which follow describe specific embodiments of the invention. These examples are set forth herein only for the purposes of illustration and should not be considered as imposing any limitation on the invention.

EXAMPLE I

The glyceride oil, 582.0 pounds of refined deodorized winterized cottonseed oil, was heated to a temperature of 140° F. and 15.0 pounds hydrogenated cottonseed oil having a titer of 58–60° C. was dissolved in the oil. 3.0 pounds of commercial monoglyceride and 0.75 pound lecithin was added and the oil was stirred to promote uniform distribution of the ingredients in the oil. The milk portion, comprising 137.0 pounds milk and 15.0 pounds sodium chloride, was added to the heated oil and the mixture was agitated and cooled in the "Votator" A unit to 60° F. After chilling, the emulsion was permitted to crystallize to a consistency approximating that of mayonnaise. The weak, gel-like crystal lattice was then broken by agitating the emulsion. A smooth, uniform, pourable emulsion resulted. This emulsion has a relatively stable viscosity over a wide temperature range. It is not overly thick at refrigerator temperatures and not too thin at room temperature. In some cases the emulsion after chilling may be thicker approaching the consistency of peanut butter.

EXAMPLE II 577.0 pounds refined corn oil was heated to 150° F. and 15.0 pounds of hydrogenated tallow having a titer of 58–60° C. was added to the hot oil. 0.75 pound lecithin and 3.0 pounds commercial monoglyceride was added and the oil was stirred. 137.0 pounds milk and 15.0 pounds sodium chloride was added to the well agitated oil and the emulsion which formed was cooled to 50° F. as it was stirred. Cooling of the emulsion was continued with mixing until it developed a jellylike consistency. It was then pumped to a dispensing station where it was poured into plastic bottles. The pumping action served to break up the weak structure resulting from incipient crystallization and the product was pourable at room temperature as well as refrigerator temperature (40–50° F.). The emulsion was very stable, exhibiting no evidence of separation.

EXAMPLE III

Emulsions were prepared in substantially the same manner described in Examples I and II and these emulsions contained the following ingredients in the amounts noted.

*Margarine emulsion A*

| Ingredient: | Amount in pounds |
|---|---|
| Refined deodorized soybean oil | 577.0 |
| Hydrogenated lard (titer 58–60° C.) | 20.0 |
| Lecithin | 0.75 |
| Commercial monoglyceride | 3.0 |
| Milk | 137.0 |
| Sodium chloride | 15.0 |

*Margarine emulsion B*

| Ingredient: | Amount in pounds |
|---|---|
| Refined deodorized safflower oil | 577.0 |
| Hydrogenated cottonseed oil (titer 50–52° C.) | 20.0 |
| Lecithin | 0.75 |
| Commercial monoglyceride | 3.0 |
| Milk | 137.0 |
| Sodium chloride | 15.0 |

*Margarine emulsion C*

| Ingredient: | Amount in pounds |
|---|---|
| Rapeseed oil | 572.0 |
| Hydrogenated soybean oil (titer 50–52° C.) | 25.0 |
| Commercial monoglyceride | 3.0 |
| Lecithin | 0.75 |
| Milk | 137.0 |
| Sodium chloride | 15.0 |

*Margarine emulsion D*

| Ingredient: | Amount in pounds |
|---|---|
| Partially hydrogenated winterized soybean oil | 567.0 |
| Hydrogenated soybean oil, I.V. 52.5 (titer 50–52° C.) | 30.0 |
| Lecithin | 0.75 |
| Commercial monoglycerides | 3.0 |
| Milk | 137.0 |
| Sodium chloride | 15.0 |

A small amount of color and flavor was added to each of Margarine Emulsion Samples A–D and these margarines were found to be very satisfactory for use in frying, brushing on toast, and pouring over cooked vegetables. No separation or crystallization was noted when they were stored in the refrigerator for extended periods of time.

EXAMPLE IV

A fluid margarine product was prepared from the following ingredients in the amounts noted:

| Ingredient: | Amount |
|---|---|
| Soft soybean oil (cold test 20 hours) lbs | 1,700 |
| Hardened rapeseed oil, titer 58.8, I.V. 8.1 lbs | 44 |
| 40% monoglyceride lbs | 8.75 |
| Lecithin lbs | 2.25 |
| Milk lbs | 390 |
| Salt lbs | 50 |
| Artificial flavor (from starter distillate) cc | 40 |
| Color and vitamins ozs | 5 |

The oil and the oil-soluble components were heated in a forewarmer to 110° F. and the heated mixture was agitated to obtain a uniform liquid. The heated oil mixture was pumped to a churn where the milk, salt and other ingredients were added. The emulsion was agitated in the churn and then passed to a votator. The temperature of the emulsion entering the votator was 100° F. and the votator consisted of three chilling units. The product was recycled from the discharge end of votator back to the churn until the product being discharged by the votator reached a temperature of about 36–38° F. The discharged product was then pumped to a 200-gallon water-jacketed stainless steel tank equipped with a one-horse-power gearhead driving motor. Two bladed paddles rotating at 20 r.p.m. are driven by the motor. The product was held in the tank for twenty minutes, during which time the agitator was running continuously. The homogeneous emulsion, at a temperature of 50–52° F., was then conducted to a filling station and filled into bottles at a filling temperature of 57° F. The flow rate of the product through the system was 2,400 lbs. per hour.

One of the important benefits insofar as acceptability of the emulsions of the invention is concerned arises from the fact that the curd of the margarine emulsion is fine and uniformly distributed throughout the product. When the emulsion is poured over hot potatoes and other hot vegetables there is no noticeable separation of curd and curd does not concentrate on the surface of the vegetables as is the case when most plastic margarines are melted on vegetables. The products of the invention provide other conveniences to housewives and hotel and restaurant users since the product is easily measured in cooking and baking and is much easier to apply to many food products than conventional plastic margarines.

While it is more convenient to break up the gel before packaging and market a perfectly fluid product, it is also possible to package the product in the gel form and allow the consumer to break up and fluidize the gel by simply shaking the product vigorously.

Obviously many modifications and variations of the invention as hereinbefore set forth may be made without departing from the spirit and scope thereof and, accordingly, only those limitations should be imposed as are indicated in the appended claims.

I claim:

1. A stable water-in-oil emulsion food product which remains pourable over a wide temperature range comprising about 60–90% of a liquid glyceride oil having a cold test in excess of about eight hours, about 40–10% of an aqueous phase containing milk solids, an emulsifier and about 0.75–5% of a hard fat.

2. A stable water-in-oil emulsion food product which remains fluid over a wide temperature range down to about 35° F. comprising about 60–90% glyceride oil phase, an emulsifier, said emulsifier selected from the group consisting of mono- and diglycerides, sodium sulfoacetate derivatives and mixtures thereof, and about 40–10% aqueous phase, said oil phase comprising an oil having a cold test in excess of about eight hours and including about 0.75–5% hard fat, said aqueous phase including at least about 10% milk solids.

3. A stable water-in-oil emulsion food product which remains fluid over a temperature range of about 35° F. and above comprising about 60–90% liquid glyceride oil which remains liquid at temperatures as low as 35° F. and about 40–10% aqueous phase, said oil phase including about 1–5% hard fat based on emulsion weight, and said aqueous phase including at least abouth 10% milk solids.

4. A stable water-in-oil emulsion food product which remains pourable over a wide temperature range comprising about 60–90% of a liquid glyceride oil phase, having a cold test in excess of about fifteen hours, about 40–10% of an aqueous phase containing milk solids, and about 0.75–5% of a hard fat having a titer in the range of about 55–65° C.

5. A water-in-oil emulsion food product which is pourable and resistant to separation over a temperature range of about 35–100° F. and above comprising about 60–90% of a liquid glyceride oil phase, said glyceride oil having a cold test in excess of about fifteen hours, about 40–10% of an aqueous phase containing milk solids, about 1–5% based on emulsion weight of said oil phase of a hard fat, and a small amount of lecithin.

6. A method for manufacturing a fluid water-in-oil emulsion food spread which retains its fluidity over a temperature range of 35° F. and above, comprising: forming an emulsion of about 60–90% of glyceride oil which is liquid at temperatures as low as about 35° F., a small amount less than about 5.0% of a hardened glyceride oil having a titer of about 55–65° C. and not more than about two-thirds of the amount of the oil phase, of an aqueous phase containing milk solids, chilling said emulsion to a temperature sufficient to convert said liquid emulsion to a viscous gel-like form, promptly agitating said emulsion to break said gel-like form and produce a uniform pourable fluid which is resistant to separation of oil and water.

7. A method of manufacturing a fluid water-in-oil emulsion food product which retains its fluidity over a temperature range of 35° F. and above comprising heating an amount of glyceride oil sufficient to provide in said emulsion about 60–90% glyceride oil and about 1–5% hard fat to a temperature of about 120–180° F., adding to said heated glyceride oil an amount of water sufficient to provide in said emulsion about 40–10% aqueous phase, said water containing at least about 10% milk solids, mixing said aqueous phase in said glyceride oil phase to form a homogeneous emulsion, cooling said emulsion to a temperature below about 60° F. while agitating said emulsion whereby to promote crystallization of said emulsion and form a weak gel structure, subjecting said weak gel structure to a force sufficient to fracture the structure and render the product fluid.

8. A water-in-oil emulsion food product which is resistant to separation of phases and resistant to viscosity increase and soldification when held at temperatures from about 78° F. down to about 35° F. comprising about 85–80% oil phase comprising a glyceride oil having a cold test in excess of about fifteen hours an emulsifier and about 15–20% aqueous phase comprising milk, said emulsion containing about 1–5% based on the weight of said emulsion of a hardened edible naturally occurring glyceride oil having a titer of about 55–65° C. uniformly distributed throughout said emulsion.

9. The emulsion of claim 8 wherein the hardened glyceride oil is hydrogenated rapeseed oil.

10. The emulsion of claim 8 wherein the hardened glyceride oil is hydrogenated cottonseed oil.

References Cited

UNITED STATES PATENTS

| | | | |
|---|---|---|---|
| 2,846,312 | 8/1958 | Lantz et al. | 99—118 |
| 2,890,959 | 6/1959 | Phillips | 99—123 |
| 3,011,896 | 12/1961 | Eber et al. | 99—118 |

A. LOUIS MONACELL, *Primary Examiner.*

M. W. GREENSTEIN, *Assistant Examiner.*